US006877411B2

(12) United States Patent
McGehee et al.

(10) Patent No.: US 6,877,411 B2
(45) Date of Patent: Apr. 12, 2005

(54) ACTIVE SAWGUIDE ASSEMBLY AND METHOD

(75) Inventors: Ronald W. McGehee, Ukiah, CA (US); Jeffrey T. Burns, Salmon Arm (CA); Rory M. Mitchell, Ukiah, CA (US)

(73) Assignee: COE Newnes/McGemee ULC, Salmon Arm (CA)

( * ) Notice: Subject to any disclaimer, the term of this patent is extended or adjusted under 35 U.S.C. 154(b) by 0 days.

(21) Appl. No.: 10/621,938

(22) Filed: Jul. 17, 2003

(65) Prior Publication Data

US 2004/0011173 A1 Jan. 22, 2004

Related U.S. Application Data

(62) Division of application No. 09/792,891, filed on Feb. 23, 2001, now Pat. No. 6,612,216.

(60) Provisional application No. 60/184,422, filed on Feb. 23, 2000.

(51) Int. Cl.[7] .................................... B23D 45/10

(52) U.S. Cl. .................... 83/425.4; 83/508.3; 83/829; 144/378

(58) Field of Search ............................ 83/425.4, 497, 83/508.3, 75.5, 823, 425.3, 829; 144/237, 378

(56) References Cited

U.S. PATENT DOCUMENTS

| | | | | | |
|---|---|---|---|---|---|
| 3,645,304 | A | * | 2/1972 | Thrasher | 83/821 |
| 4,599,929 | A | * | 7/1986 | Dutina | 83/821 |
| 4,690,188 | A | * | 9/1987 | Hasenwinkle | 144/250.2 |
| 5,722,474 | A | * | 3/1998 | Raybon et al. | 144/357 |
| 5,870,936 | A | * | 2/1999 | McGehee | 83/13 |
| 6,178,858 | B1 | * | 1/2001 | Knerr et al. | 83/76.8 |
| 6,612,216 | B1 | * | 9/2003 | McGehee et al. | 83/425.4 |

* cited by examiner

*Primary Examiner*—Kenneth E. Peterson
(74) *Attorney, Agent, or Firm*—Antony C. Edwards

(57) ABSTRACT

A sawguide assembly includes a set of sawguides positioned adjacent to one another to create an array of laterally-abutting sawguides. A sawguide biasing assembly biases the sawguides against one another. The array is supported for movement along a lateral path generally parallel to the axis of the arbor. A lateral driver is used to move the entire array in unison along the lateral path. A sawguide array skewing assembly couples the sawguides to one another so that the sawguides can be pivoted in unison about their respective pivot axes by a skewing driver.

6 Claims, 11 Drawing Sheets

ACTIVE SAWGUIDE ASSEMBLY AND METHOD

CROSS REFERENCE TO RELATED APPLICATION

This is a Divisional Patent Application of U.S. patent application Ser. No. 09/792,891 filed Feb. 23, 2001 now U.S. Pat. No. 6,612,216, which claims the benefit of Provisional Patent Application No. 60/184,422 filed Feb. 23, 2000.

FIELD OF THE INVENTION

This invention relates to a method and an apparatus for straight or curve sawing workpieces such as cants or timbers or lumber, and in particular relates to an active sawguide package system which is constantly adjusted to a target line during sawing, for curve sawing workpieces according to an optimized profile.

BACKGROUND OF THE INVENTION

It is known that in today's competitive sawmill environment, it is desirable to quickly process straight or non-straight cants so as to recover the maximum volume of cut lumber possible from the cant. For non-straight cants, volume optimization means that, with reference to a fixed frame of reference, either the non-straight cant is moved relative to a gangsaw of circular saws, or the gangsaw is moved relative to the cant, or a combination of both, so that the saws in the gangsaw may cut an optimized non-straight path along the cant, so-called curve-sawing.

A canted log, or "cant", by definition has first and second opposed cut planar faces. In the prior art, cants were fed linearly through a profiler or gang saw so as to produce at least a third planar face either approximately parallel to the center line of the cant, so called pith sawing, or split taper sawing, or approximately parallel to one side of the cant, so called full taper sawing; or at a slope somewhere between split and full taper sawing. For straight cants, using these methods for volume recovery of the lumber can be close to optimal. However, logs often have a curvature and usually a curved log will be cut to a shorter length to minimize the loss of recovery due to this curvature. Consequently, in the prior art, various curve sawing techniques have been used to overcome this problem so that longer length lumber with higher recovery may be achieved.

Curve sawing typically uses a mechanical centering system that guides a cant into a secondary break-down machine with chipping heads or saws. This centering action results in the cant following a path very closely parallel to the center line of the cant. Cants that are curve sawn by this technique generally produce longer, wider and stronger boards than is typically possible with a straight only sawing technique where the cant being sawn has significant curvature. Boards that are cut using curve sawing techniques straighten out once they are stacked and dried.

Curve sawing techniques have also been applied to cut parallel to a curved face of a cant; the above mentioned full taper sawing. See for example Kenyan, U.S. Pat. No. 4,373,563 and Lundstrom, Canadian Patent No. 2,022,857. Both the Kenyan and Lundstrom devices use mechanical means to center the cant during curve sawing and thus disparities on the surface of the cant such as scars, knots, branch stubs and the like tend to disturb the machining operation and produce a "wave" in the cant. Also, cants subjected to these curve sawing techniques tend to have straight sections on each end of the cant. This results from the need to center the cant on more than one location through the machine. That is, when starting the cut the cant is centered by two or more centering assemblies until the cant engages anvils behind the chipping heads. When the cant has progressed to the point that the centering assemblies in front of the machine are no longer in contact, the cant is pulled through the remainder of the cut in a straight line. It has also been found that full taper curve sawing techniques, because the cut follows a line approximately parallel to the convex or concave surface of the cant, can only produce lumber that mimics these surfaces, and the shape produced may be unacceptably bowed.

Thus in the prior art, so called arc-sawing was developed. See for example U.S. Pat. Nos. 5,148,847 and 5,320,153. Arc sawing was developed to saw irregular swept cants in a radial arc. The technique employs an electronic evaluation and control unit to determine the best semi-circular arc solution to machine the cant, based, in part, on the cant profile information. Arc sawing techniques solve the mechanical centering problems encountered with curve sawing but limit the recovery possible from a cant by constraining the cut solution to a radial form.

Applicant is also aware of U.S. Pat. No. 4,572,256, U.S. Pat. No. 4,690,188, U.S. Pat. No. 4,881,584, U.S. Pat. No. 5,320,153, U.S. Pat. No. 5,400,842 and U.S. Pat. No. 5,469,904; all of which relate to the curve sawing of two-sided cants. Eklund, U.S. Pat. No. 4,548,247, teaches laterally translating chipping heads ahead of the gangsaws. The U.S. Pat. Nos. 4,690,188 and 4,881,584 references teach a vertical arbor with an arching infeed having corresponding non-active tilting saws and, in U.S. Pat. No. 4,881,584, non-active preset chip heads mounted to the sawbox.

U.S. Pat. No. 4,599,929 to Dutina teaches actively translating and skewing of gangsaws for curve sawing, where a saw guide package is adjusted. The saw axle may also be adjusted in view of the average inclination over the sawing line of the entire longitudinal profile of the workpiece or of parts of the longitudinal profile.

U.S. Pat. No. 4,144,782 to Lindstrom teaches that when curve sawing a log, the log is positioned so as to feed the front end of the log into the saw with the center of the log exactly at the saw blade. In this manner the tangent of the curve line for the desired cut profile of the log extends, starting at the front end, parallel with the direction of the saw blade producing two blocks which are later dried to straighten and then re-sawn in a straight cutting gang.

U.S. Pat. No. 5,884,682 to Kennedy et. al, discloses that optimized lumber recovery is best obtained for most if not all cants if a unique cutting solution is determined for every cant. Thus for each cant a "best" curve is determined, which in some instances is merely a straight line parallel to the center line of the cant, and in other instances a complex curve that is only vaguely related to the physical surfaces of the cant.

U.S. Pat. No. 5,722,474 to Raybon, et al. teaches using scanned data to saw a cant, by moving the cant through the gang sawbox while pivoting and translating the gang sawbox. The gang sawbox contains a fixed sawguide package to curve saw the curvature in the log.

U.S. Pat. Nos. 5,761,979 and 5,870,936 to McGehee disclose using a saw guide or saw guides where sawguides and saws are actively translated along a fixed driven arbor. The sawguides and saws may be skewed a few degrees on either side of the perpendicular to the arbor axis, so that the saws either actively traverse a non-symmetrical board fed into the saws lineally for optimum board edging, or actively follow a curved path for sawing boards from a cant fed into the saws lineally, from optimized data of the scanned profile. This system permits curve sawing without requiring the movement of the entire saw box.

SUMMARY OF THE INVENTION

The present invention is directed to an active sawguide assembly, used to position saws along an arbor to permit curve sawing without the need to move the entire saw box.

The sawguide assembly includes a set of sawguides positioned adjacent to one another to create an array of laterally-abutting sawguides. A sawguide biasing assembly, which may include a sawguide clamping cylinder, biases the sawguides against one another. An array support, such as one including a shaft or a bar, supports the array for movement along a lateral path generally parallel to the axis of the arbor. A lateral driver, which may comprise a translation cylinder, is used to move the entire array in unison along the lateral path. A sawguide array skewing assembly couples the sawguides to one another so that the sawguides can be pivoted in unison about their respective pivot axes by a skewing driver.

Another aspect of the invention is directed to a method for a laterally translating saws along and pivoting saws relative to a drive arbor. The method includes simultaneously laterally positioning an array of adjacent, laterally-contacting sawguides along a drive arbor. The sawguides are also simultaneously pivoted about their pivot axes causing the contacting lateral sides of the sawguides to slide over one another.

Other features and advantages of the invention will appear from the following description in which the disclosed embodiment is described in detail in conjunction with the accompanying drawings.

BRIEF DESCRIPTION OF THE DRAWINGS

The invention will be better understood by reference to drawings, wherein.

DETAILED DESCRIPTION OF PREFERRED EMBODIMENTS

Figure 1:
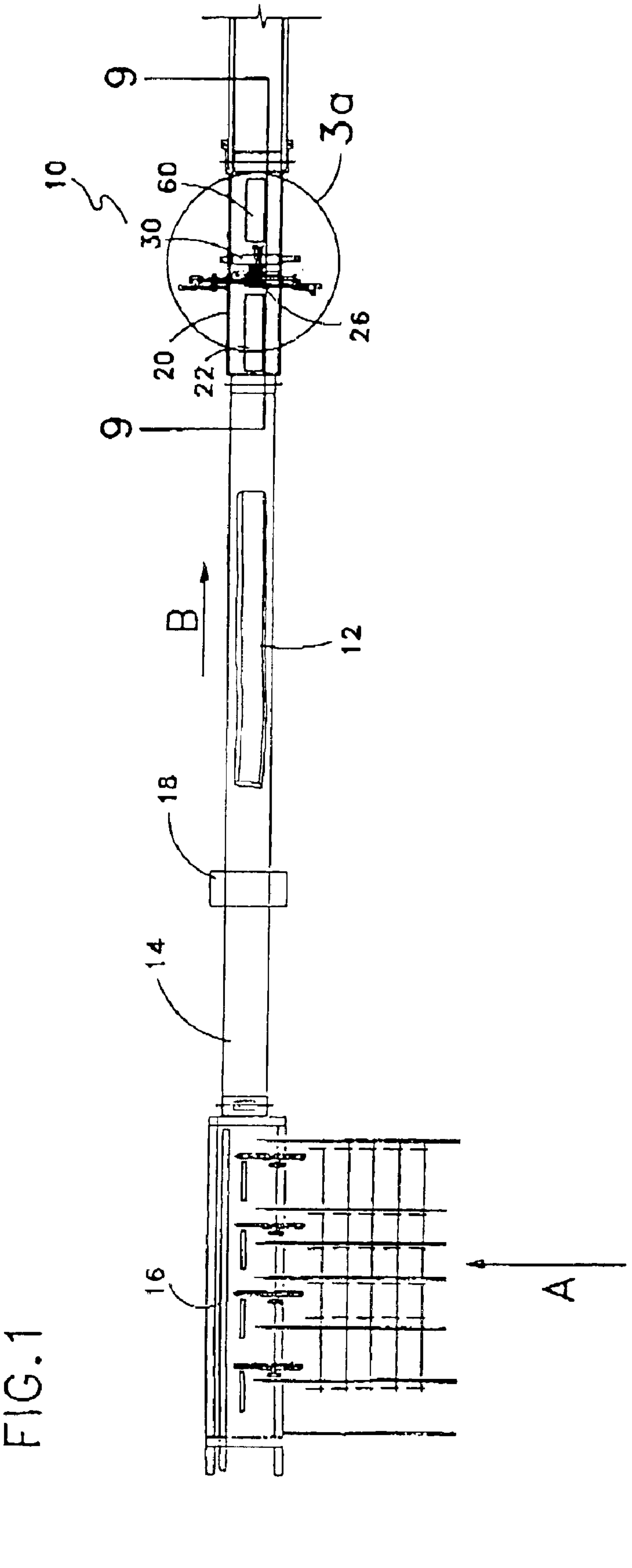
FIG. 1 is a plan view showing the sawing system of the present invention.

Referring to the drawing figures wherein similar characters of reference represent corresponding parts in each view, the active sawguide assembly of the present invention is generally indicated by the reference numeral 10.

Figure 9:
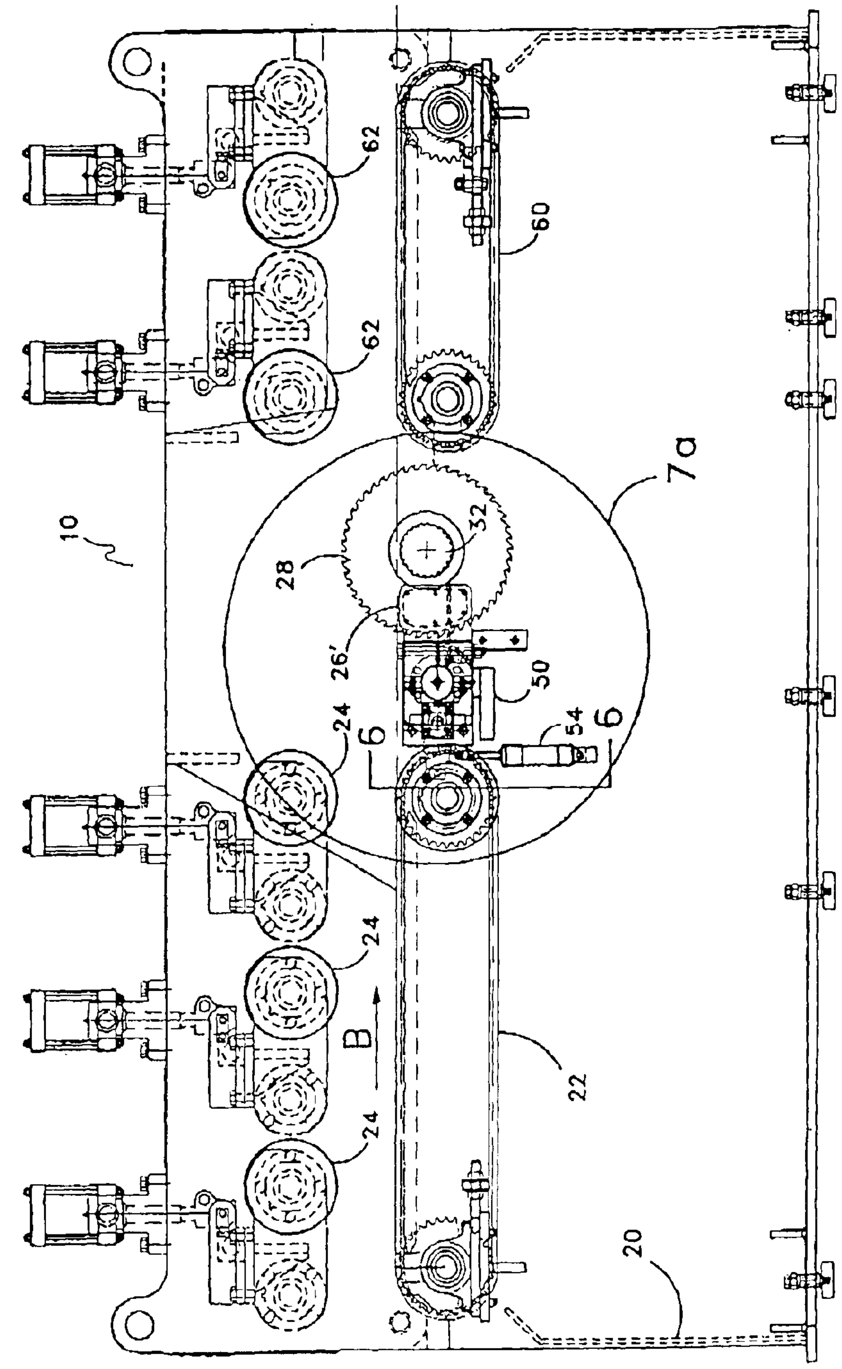
FIG. 9 is an enlarged view, along section line 9—9 in FIG. 1, of the active sawguide system of the present invention within the sawbox.

A workpiece 12 is fed transversely from the mill in direction A and is directed onto a lineal transfer 14 and positioned against a fixed fence 16 or other positioning means, for roughly or approximately centering the workpiece on the lineal transfer. Once workpiece 12 is roughly centered on lineal transfer 14 it is translated lineally in direction B through a lineal scanner 18 towards sawbox 20. Scanner 18 scans workpiece 12. Once through the scanner workpiece 12 is translated onto an infeed sharpchain transfer 22 positioned within the infeed area of sawbox 20. As best seen in FIG. 9 a plurality of overhead driven press rolls 24 are located above infeed sharpchain transfer 22. Press rolls 24 press down on workpiece 12 to feed workpiece 12 straight into sawbox 20 in direction B.

The outfeed area of sawbox 20 also has a circulating sharpchain transfer 60 cooperating with a plurality of outfeed overhead pressrolls 62. Pressrolls 24 press workpiece 12 onto lower infeed sharpchain 24. Pressrolls 24 and 62 provide for continued straight feeding of workpiece 12 through sawbox 20. Note, however, workpiece 12 could be fed through sawbox 20 along a curved or partially curved path.

Figure 2:
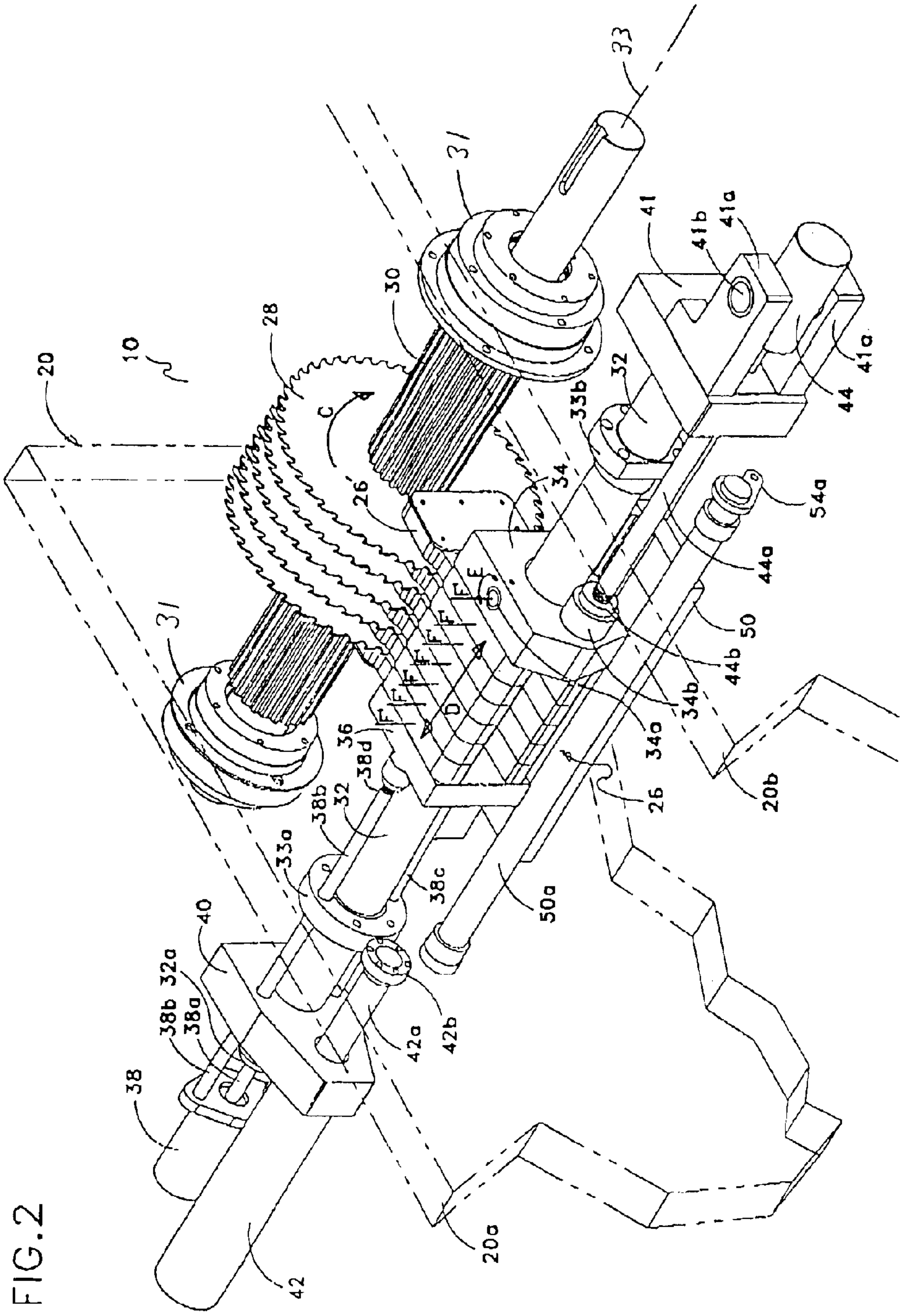
FIG. 2 is an isometric view showing the active sawguide assembly of the present invention.
Figure 4:
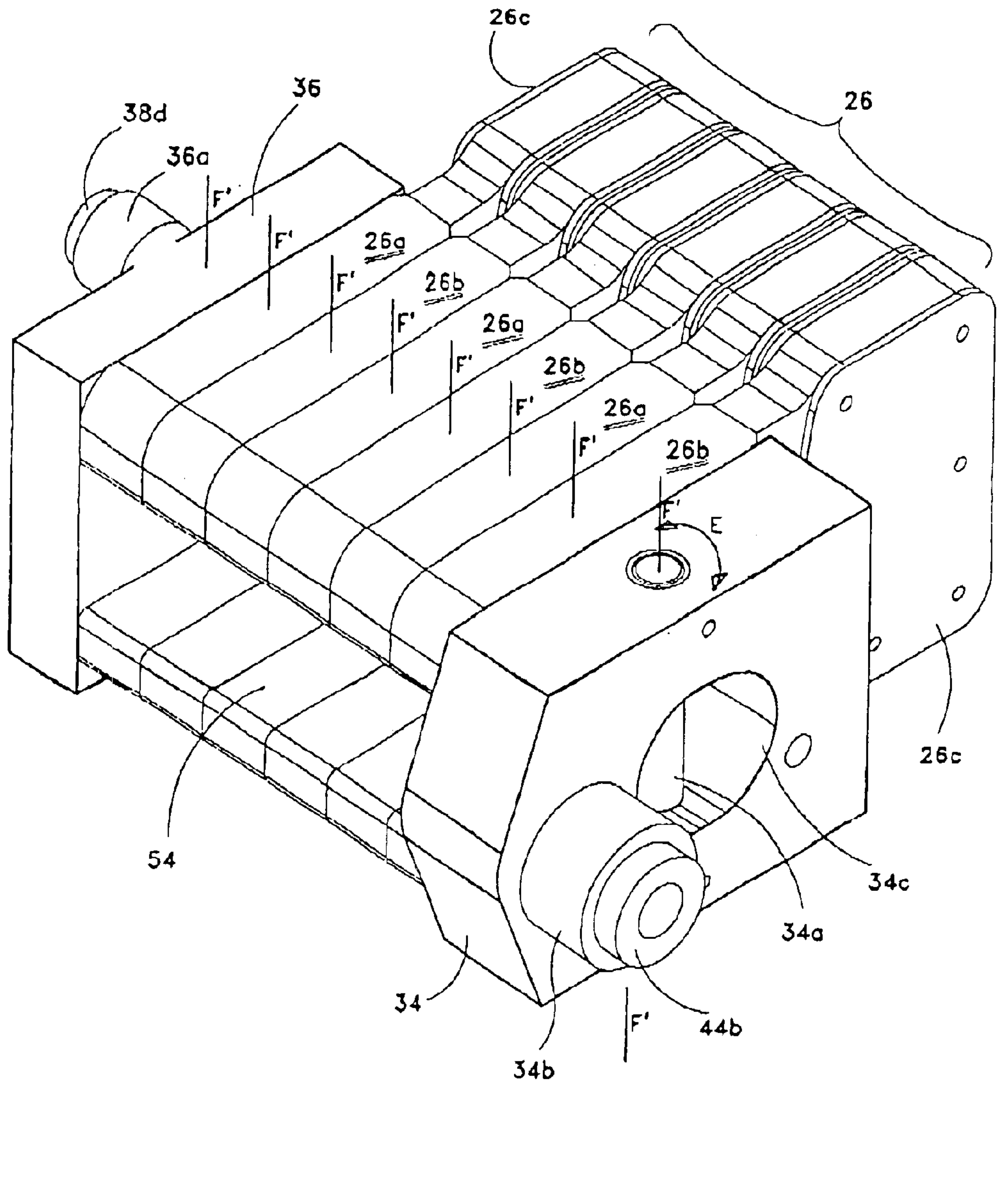
FIG. 4 is an enlarged isometric view of the active sawguide package of the present invention.
Figure 4A:
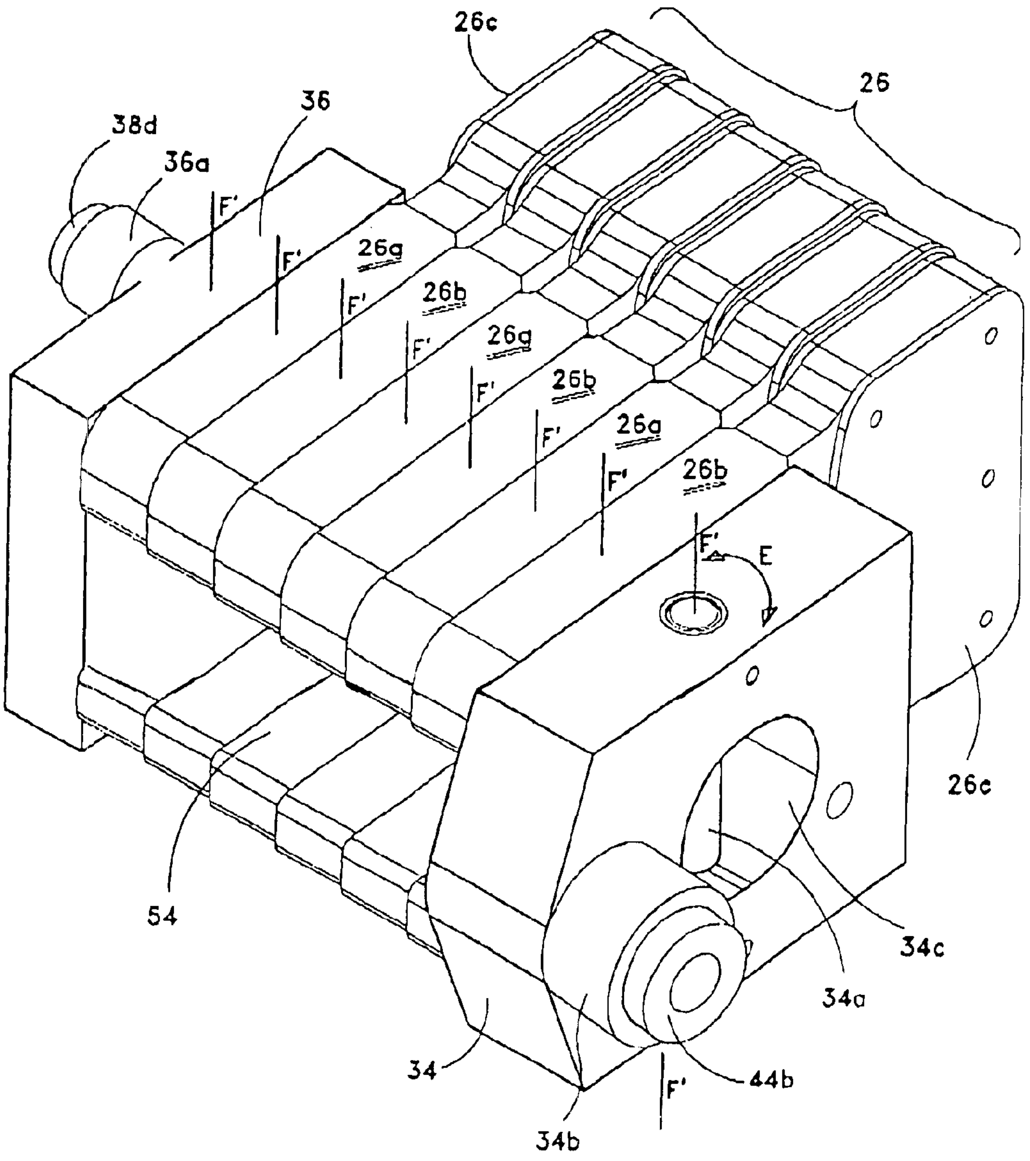
FIG. 4*a* is the view of FIG. 4 showing the sawguide package skewed.

As best seen in FIGS. 2 and 4, active sawguide assembly 26 is mounted within sawbox 20. Active sawguide assembly 26 guides a plurality of circular saws 28 mounted in parallel array on splined arbor 30. Arbor 30 is supported by sawbox 20 through bearings 31 for rotation about a saw axis 33. Saws 28 are held snugly between pairs of sawguides and are spline mounted onto the arbor so as to be free to translate, i.e. slide, laterally on the arbor. Other cross-sectional shapes, such as scalloped, may also be feasible for arbor 30. Active movement, as better described below, of sawguide assembly 26 actively moves the saws so that an optimized sawing path through workpiece 12 may be followed, thereby producing improved lumber recovery. The optimized sawing path is determined by an optimizing processor (not shown) processing data from the scanned image of workpiece 12.

Figure 3A:
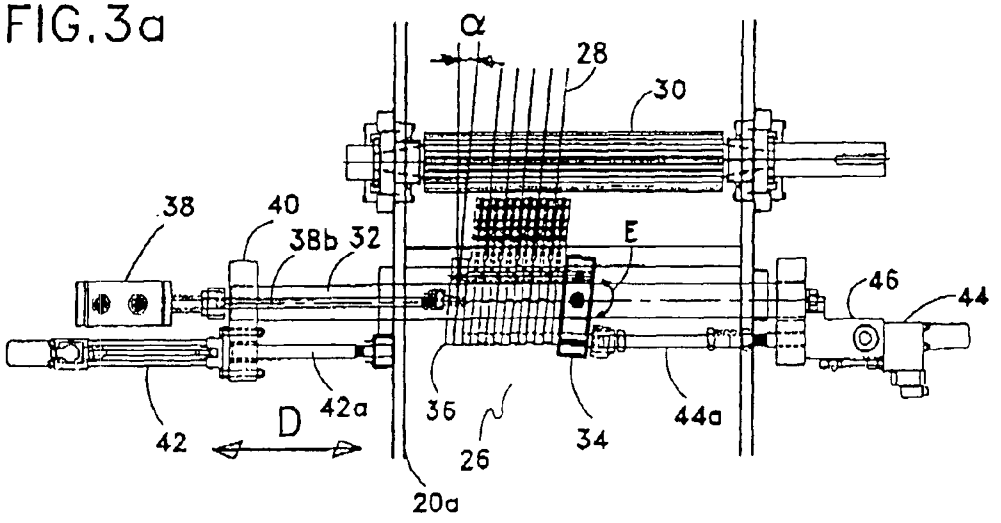
FIG. 3*a* is an enlarged view taken from FIG. 1 showing the active sawguide package having been skewed right and translated left.
Figure 3B:
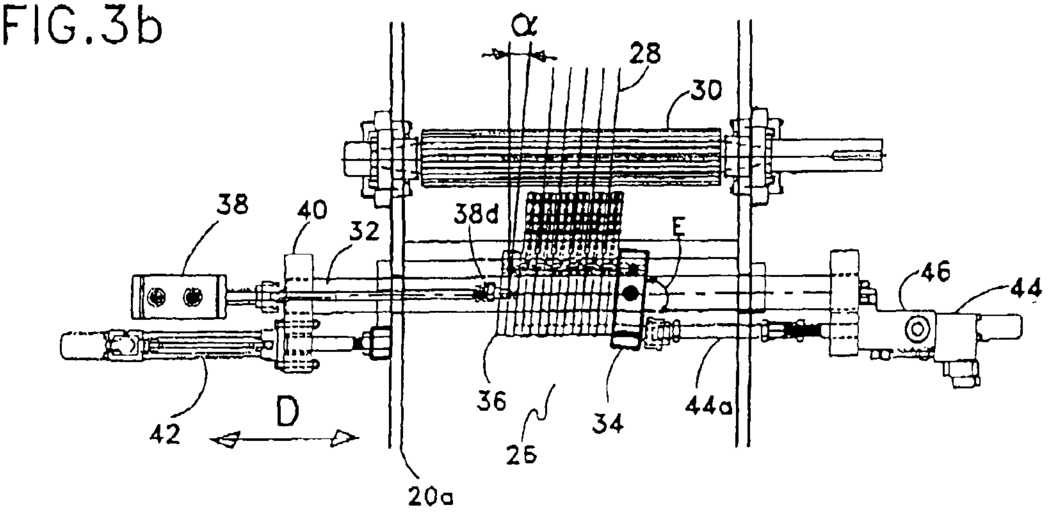
FIG. 3*b* is an enlarged view taken from FIG. 1 showing the active sawguide package having been skewed right and translated to the center of the sawbox.
Figure 3C:
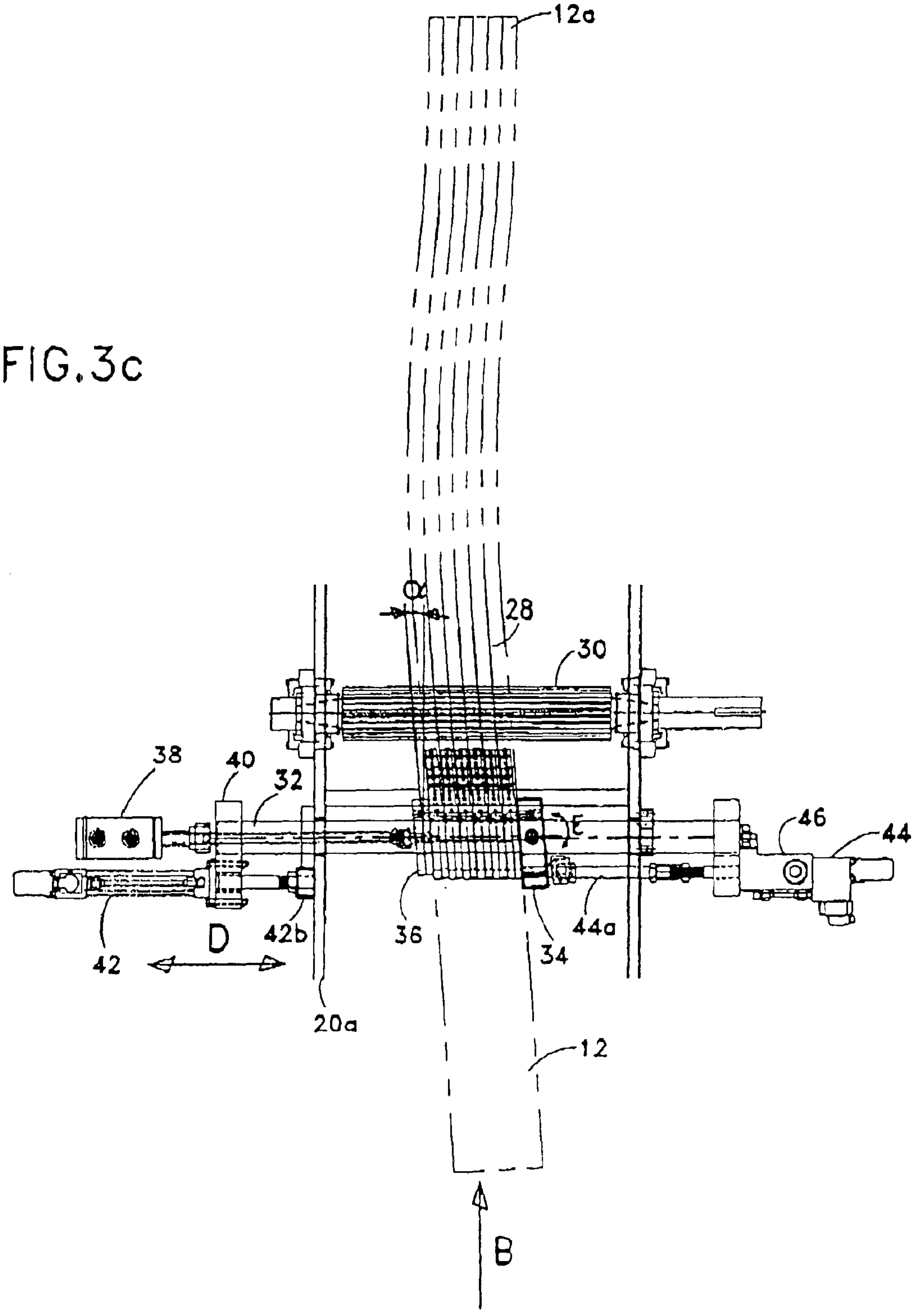
FIG. 3*c* is an enlarged view taken from FIG. 1 showing the active sawguide package having been skewed left and translated to the center of the sawbox.

As best seen in FIGS. 3*a*, 3*b* and 3*c*, in operation sawguide assembly 26 simultaneously skews to a desired skew angle $\alpha$ and laterally translates to a cut starting position as workpiece 12 begins to enter into sawbox 20. Once sawing commences, sawguide assembly 26 and saws 28 actively skew and translate in unison. Arbor 30 is driven to turn saws 28 in direction C for sawing of workpiece 12. Otherwise it remains fixed relative to the sawbox. Thus by a combination of skewing and lateral translation relative to the sawbox, boards 12*a* are sawn from workpiece 12 by the saws following an optimized curve as workpiece 12 passes straight through sawbox 20, sawbox 20 remaining fixed. Thus, curve sawing our workpiece 12 can be accomplished with only the movement of sawguide package and the associated hardware shown in FIGS. 2–3*c*. This eliminates the need to move the entire sawbox 20, which may weigh as much as 20,000 to 40,000 pounds, as is necessary with many prior curve-sawing systems. This increases the speed, efficiency and throughput of the system while simplifying the design and operation.

As best seen in FIGS. 2 and 4, active sawguide assembly 26 includes a set of adjacent sawguides 26' cooperating in pairs. Each sawguide pair includes sawguides 26*a* and 26*b* mounted on and supported by a sawguide bar 32. Sawguide 26*a* and 26*b* in each sawguide pair are sandwiched together between sawguide steering block 34 and a sawguide clamping block 36. Steering block 34 is fixed to base 32 by a pivot pin 34*a*, as is discussed below. Sawguide clamping block 36 presses the sawguides together against steering block 34 with a constant pressure which may be between 6,000 to 10,000 lbs. per square inch. Sawguide clamping cylinder 38 is mounted to end 32*a* of sawguide bar 32 by cylinder rod 38*a*. Cylinder 38 tensions rod 38*a* so as to drive parallel push rods 38*b* and 38*c* against clamping block 36. Clamping block 36 is thus actuated by sawguide clamping cylinder 38 via push rods 38*b* and 38*c*. Clamping push rods 38*b* and 38*c* are parallel to, and disposed on opposite sides of, sawguide bar 32. They are journelled through parallel apertures in mounting block 40. Rods 38*b* and 38*c* are rotatably mounted to clamping block 36 by spherical rod ends 38*d* & 38*e*, so that when cylinder rod 38*a* pulls on sawguide bar 32, clamping rods 38*b* and 38*c* apply pressure to clamping block 36 as clamping block 36 is articulated as set out below. Accordingly, sawguides 26' are biased against one another by a sawguide biasing assembly comprising sawguide clamping cylinder 38 acting on sawguide clamping block 36 with the sawguides captured between blocks 34, 36.

Sawguide bar 32 is slidably journalled in collars 33*a* and 33*b* mounted on corresponding sawbox walls 20*a* and 20*b* and so may be translated back and forth in direction D by actuation of translation cylinder 42. Translation cylinder 42 is rigidly mounted to mounting block 40. Mounting block 40 is rigidly mounted to end 32*a* of sawguide bar 32. Translation cylinder 42 actuates translation cylinder rod 42*a*. The distal end 42*b* of translation cylinder rod 42*a* is mounted to wall 20*a* of sawbox 20, so that translation cylinder 42 when actuated actively translates sawguide bar 32 (and cylinder 42, block 40, cylinder 38 and rods 38*a*–38*c* therewith) in direction D relative to sawbox 20. Therefore, translation cylinder 42 acts as a lateral driver which drives the array of sawguides in unison along a lateral path defined by sawguide bar 32. Simultaneously, articulating steering cylinder 44 actively skews sawguide assembly 26 in direction E about pivot axis F, so as to follow an optimized sawing path such as illustrated by way of example in FIGS. 3*a*–3*c*. Steering cylinder 44 is pivotally mounted to block 41, between arms 41*a*, by means of pin 41*b*. Block 41 is rigidly mounted to end 32*b* of sawguide bar 32. Accordingly, the distance between block 41 and block 34 remains fixed.

Sawguide steering block 34 is rotatably mounted to sawguide bar 32 by steering pin 34*a*. Pin 34*a* lies along axis F. Steering pin 34*a* is mounted through steering block 34 and sawguide bar 32, so that steering block 34 may be pivoted about pivot axis F relative to sawguide bar 32 by actuation of cylinder 44 driving rod 44*a* and so that steering block 34 translates with sawguide bar 32 when sawguide bar 32 translates back and forth in direction D. Steering cylinder 44 and block 41 both translate with sawguide bar 32.

Cylinder rod 44*a* is connected to steering block 34 by a zero clearance spherical rod end 44*b* seated in cup 34*b*. Spherical rod end 44*b* allows steering block 34 to be pivoted in direction E the optimized skew angle $\alpha$, that is, skewed from the orthogonal to the axis of rotation of driven arbor 30. Sawguide clamping block 36 will give resiliently under pressure, just enough to allow the sawguide 26*a* to slide over and relative to adjacent sawguide 26*b* as the sawguide assembly 26 is actively skewed by pivoting of steering block 34 in direction G. The sliding of adjacent sawguides one over the other while maintaining the sawguides pressed together allows for the active skewing of the sawguide package and hence the active steering of the saws.

As best seen in FIG. 4, steering block 34 has an elliptical aperture 34*c* to allow steering block 34 to skew the required angle while restraining sawguide assembly 26 from vertical translation.

Figure 5:
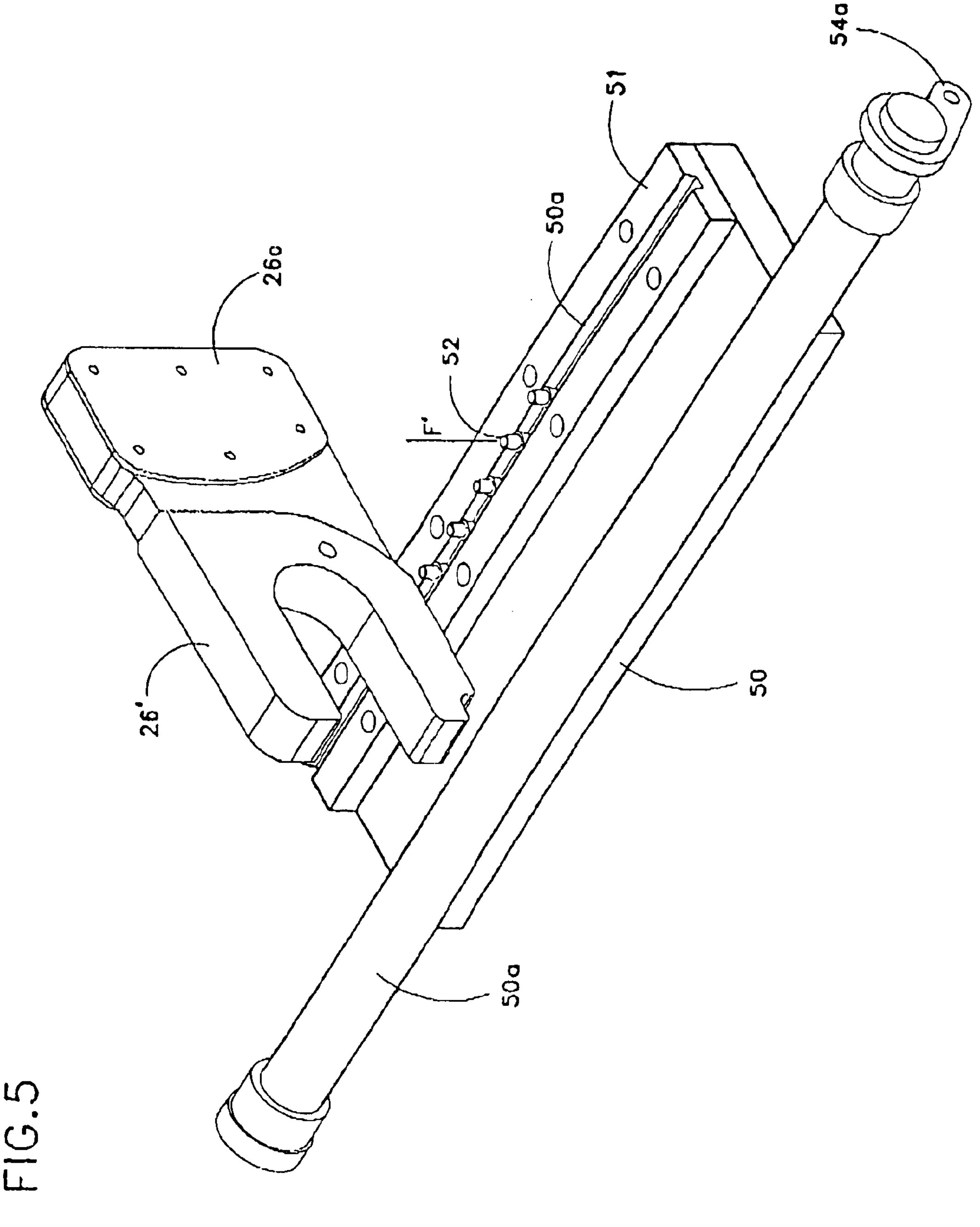
FIG. 5 is an isometric view of a sawguide containment plate and one sawguide of the active sawguide package of the present invention.
Figure 6:
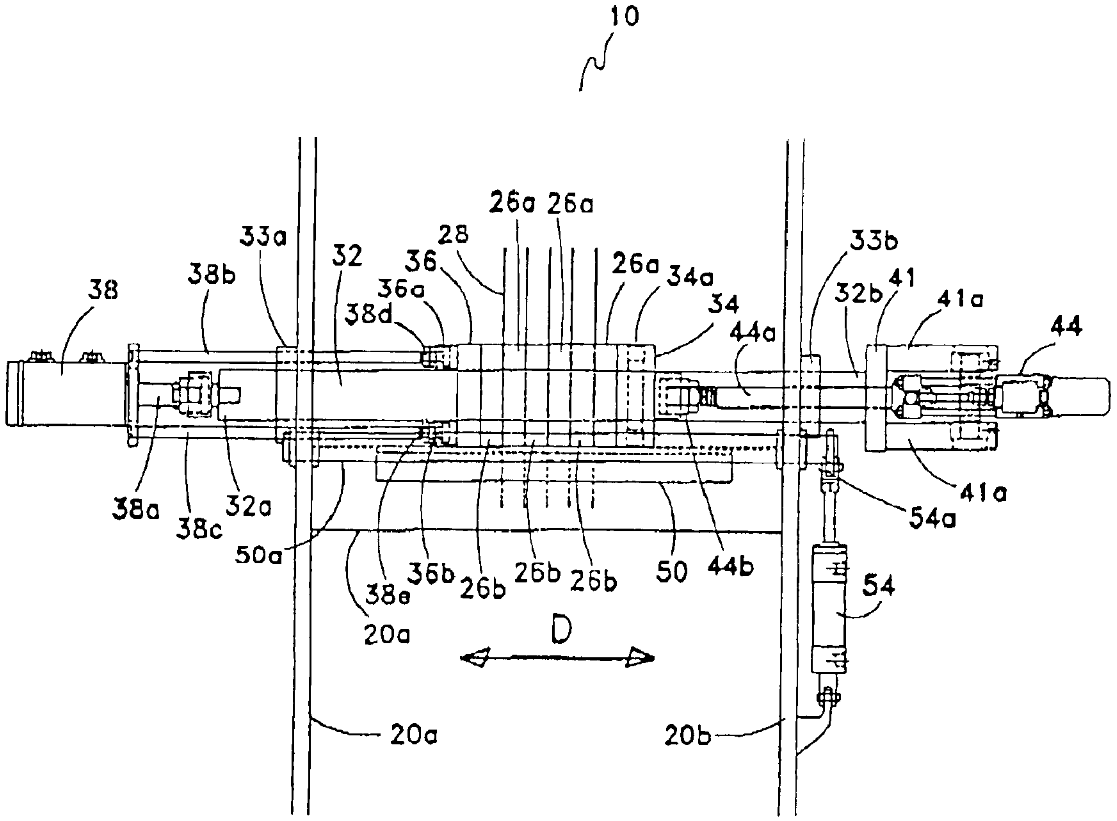
FIG. 6 is a cross-sectional view section line 6—6 in FIG. 9.
Figure 7A:
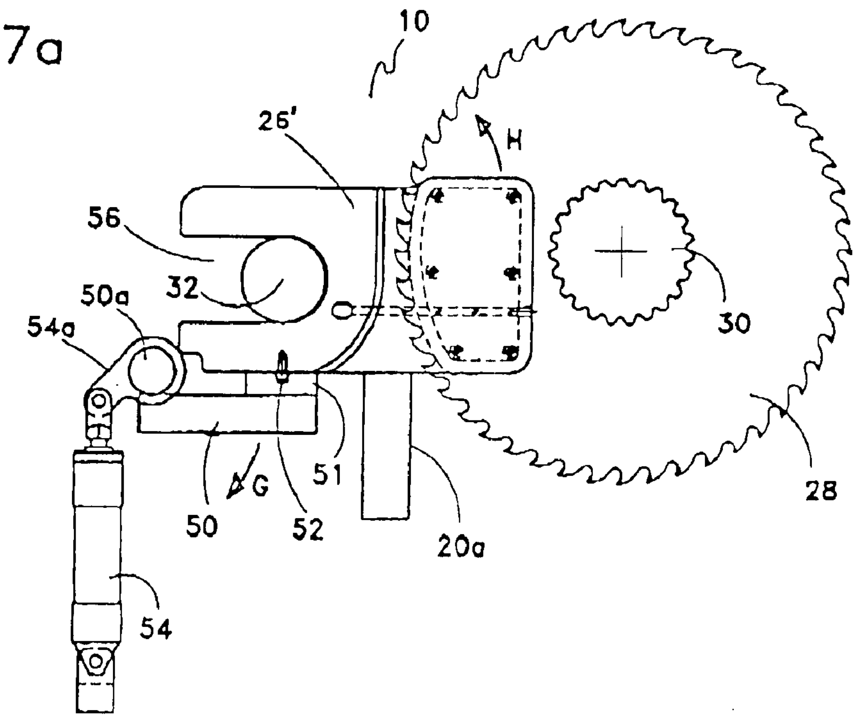
FIG. 7*a* is an enlarged partially cut-away view taken from FIG. 9.

As best seen in FIG. 5, a sawguide containment plate 50 is rotatably supported by a containment plate shaft 50*a*. When elevated to the horizontal as seen in FIG. 7*a*, a track 51, mounted on plate 50 parallel to shaft 50*a*, engages the underside of sawguide assembly 26. Track 51 has a trough or channel 51*a* along its length for engaging correspondingly positioned sawguide pivot containment pins 52 mounted to the underside of each sawguide 26'. Pins 52 form a laterally spaced array lying in a plane containing steering pin 34*a*. Each sawguide 26' has its corresponding pin 52. Pins 52 hold sawguides 26' in position during skewing, providing for pivoting of each sawguide 26' about its corresponding pivot axis F'. Channel 51*a* has a length as required for the desired capacity of sawbox 20. That is, when sawguide assembly 26 is translated in direction D, pivot pins 52 slide along channel 51*a* while simultaneously allowing sawguides 26 to actively skew.

Figure 7B:
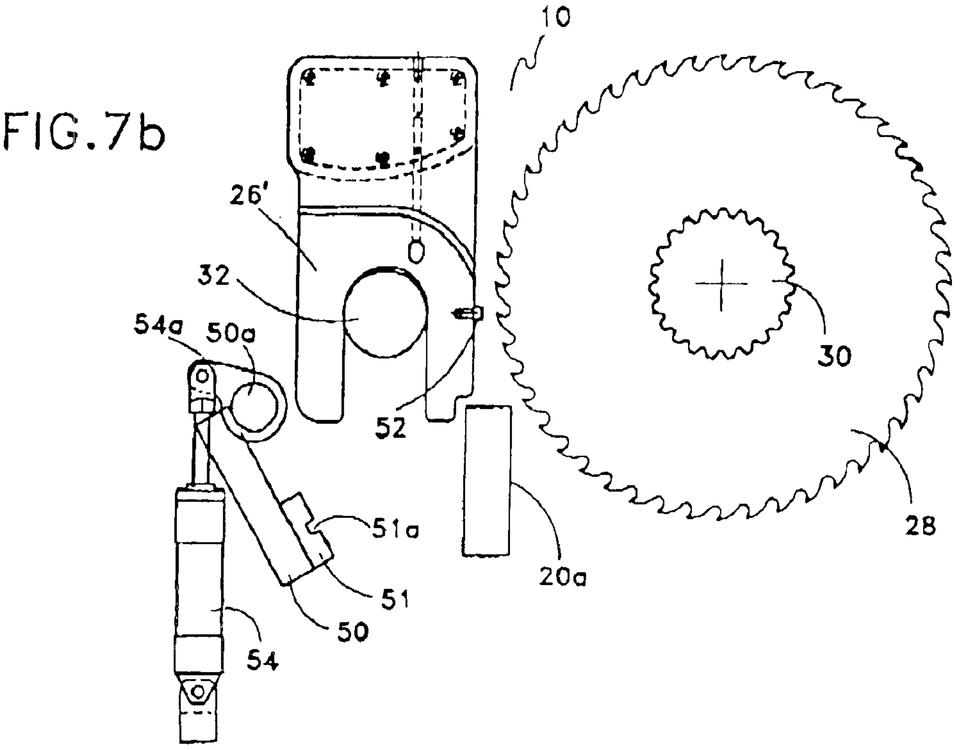
FIG. 7*b* is the view of FIG. 7*a* showing the sawguide containment plate in a lowered position.

Sawguides 26' each have an elongated "C"-shaped relief 56, which allows the sawguides to slide onto sawguide bar 32. Relief 56 when mounted over sawguide bar 32 holds sawguides 26 in relative position while allowing the changing of sawguides 26' when required without the need to disassemble the entire sawguide assembly 10. When the sawguide clamping cylinder 38 is released, sawguide containment plate 50 can, as best seen in FIGS. 7*a* and 7*b*, be lowered in direction G by actuation of sawguide containment plate cylinder 54. This then allows sawguides 26' to rotate upwardly in direction H to change either saws 28 or sawguides 26'. Sawguides 26' are removed, for example, to change the sawguide pads 26*c*.

Figure 8:
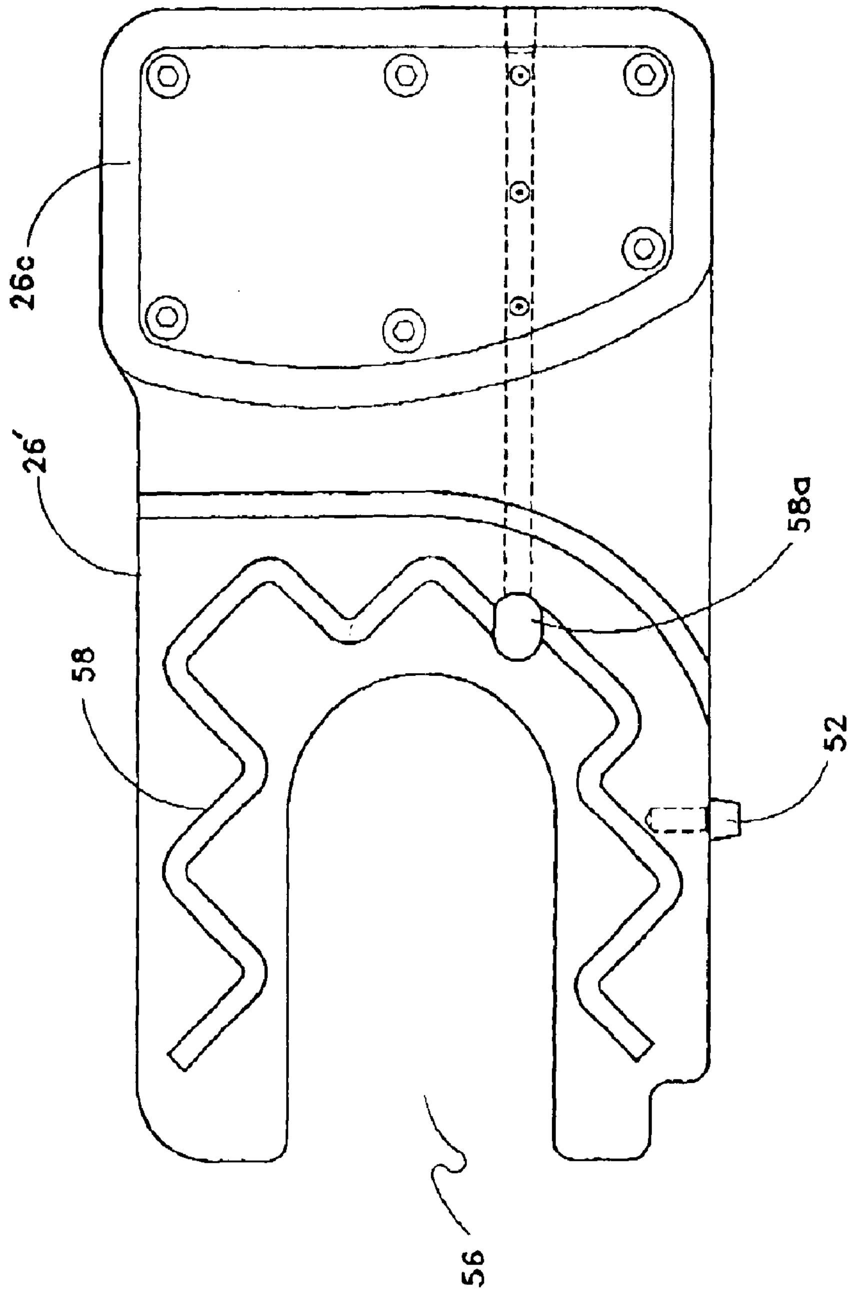
FIG. 8 is an enlarged side elevation view of a sawguide showing the side lubrication path.

Sawguides 26', steering block 34 and pressure block 36 include internal lubrication galleries. The lubrication galleries feed lubrication fluid to zigzag lubrication channels 58 located externally on one side of each sawguide 26' as better seen in FIG. 8. The lubrication fluid flows from the galleries, via ports 58*a*, into and along channels 58. The lubrication fluid distributes itself between the side surfaces of adjacent sawguides 26' so as to reduce friction and allow the side surfaces of sawguides 26' to scuff and slide over one another when sawguide package is skewed under pressure. Sawguides 26' and 26*b* may also include dissimilar metals or other materials or coatings to further reduce scuffing friction or gauling when sawguides 26' are actively skewed during optimized sawing.

In use, workpieces 12 is directed to sawbox 20 and driven past saws 28. Sawguides 26' laterally position saws 28 along the axis of arbor 30 and also change the skew angle of the saws 28 according to the desired path to be cut. The set of sawguides 26' is captured between sawguide steering block 34 and sawguide clamping block 36, with steering block 34 pivotally secured to bar 32. Shaft 32 and the sawguides 26' therewith are moved laterally, that is in the direction of arrow D, in unison thus sliding saws 28 along arbor 30 by the activation of translator cylinder 42. The skew angles of circular saws 28 are changed in unison by actuating articulating cylinder 44.

Modification and variation can be made to the disclosed embodiment without departing from the subject of the invention as defined in the following claims. For example, instead of using clamping cylinder 38, a spring-type clamping device could be used. Also, rods could be used to secure blocks 34, 36 to one another so long as relative sliding movement between the sawguides is permitted; in such case sawguide assembly 26 could be slidably mounted to bar 32. It may be desired to use lateral position devices, such as piston and cylinder arrangements, extending from both sides of sawguide assembly 26. While the surfaces of sawguides 26' are preferably flat and smooth, it may be possible to replace the disclosed flat surface to flat surface engagement between the sawguides with, for example, a series of rollers. It may be possible for the end-most sawguide 26' to perform the functions of steering and clamping blocks 34, 36 so to eliminate the need for separate blocks 34, 36. The invention has described with reference to a horizontally-oriented saw axis 33. The invention is also applicable for saw axes at other orientations, such as vertical and generally vertical; appropriate modifications to the various components of the system, such as the use of appropriate workpiece infeed components, may be made, when the necessary or desirable, when saw axis 33 is not horizontal.

Any and all patents, patent applications and printed publications referred to above are hereby incorporated by reference.

What is claimed is:

1. A method for laterally translating saws along and pivoting saws relative to a drive arbor, comprising:

simultaneously laterally positioning an array of adjacent, laterally-contacting sawguides along a drive arbor, each said sawguide having a pivot axis and lateral sides;

simultaneously pivoting said sawguides about said pivot axes causing the contacting lateral sides to slide over one another, wherein the laterally positioning step comprises mounting the sawguides onto an elongate member oriented parallel to the drive arbor and comprises biasing the array of sawguides against a steering structure secured to the elongate member, wherein the laterally positioning step is carried out with the steering structure pivotally mounted to the elongate member for pivotal movement about a steering structure axis.

2. The method according to claim 1 wherein the simultaneously pivoting step comprises selectively pivoting the steering structure about the steering structure axis.

3. The method according to claim 1 wherein the laterally positioning step is carried out with sawguides having opposed, flat, contacting sliding surfaces.

4. The method according to claim 1 wherein the simultaneously pivoting step is carried out with pivot pins extending between each said sawguide and a channel oriented parallel to the drive arbor.

5. The method according to claim 1 wherein the laterally positioning step is carried out in a manner so to position the sawguides along a path oriented parallel to the drive arbor.

6. The method according to claim 5 wherein the laterally positioning step is carried out with the path being a generally horizontal path.

* * * * *